(12) United States Patent
Dvorkovich et al.

(10) Patent No.: US 12,141,542 B2
(45) Date of Patent: Nov. 12, 2024

(54) METHODS AND SYSTEMS FOR CREATING A TRAINING DATASET FOR TRAINING A MACHINE LEARNING ALGORITHM (MLA) FOR A MACHINE-TRANSLATION TASK

(71) Applicant: YANDEX EUROPE AG, Lucerne (CH)

(72) Inventors: Anton Aleksandrovich Dvorkovich, Moscow (RU); Roman Olegovich Peshkurov, g Kolomna (RU)

(73) Assignee: Y.E. Hub Armenia LLC, Yerevan (AM)

( * ) Notice: Subject to any disclaimer, the term of this patent is extended or adjusted under 35 U.S.C. 154(b) by 237 days.

(21) Appl. No.: 17/553,798

(22) Filed: Dec. 17, 2021

(65) Prior Publication Data
US 2022/0198159 A1 Jun. 23, 2022

(30) Foreign Application Priority Data

Dec. 22, 2020 (RU) .......................... RU2020142417

(51) Int. Cl.
*G06F 40/58* (2020.01)
*G06F 40/44* (2020.01)

(52) U.S. Cl.
CPC .............. *G06F 40/58* (2020.01); *G06F 40/44* (2020.01)

(58) Field of Classification Search
None
See application file for complete search history.

(56) References Cited

U.S. PATENT DOCUMENTS

| | | | | |
|---|---|---|---|---|
| 5,778,356 A * | 7/1998 | Heiny | ...................... | G06F 9/454 |
| 9,465,797 B2 * | 10/2016 | Ji | ............................. | G06F 40/44 |
| 2009/0063462 A1 * | 3/2009 | Alfonseca | ............. | G06F 40/232 |
| | | | | 707/999.005 |
| 2018/0101522 A1 * | 4/2018 | Fujiwara | .................. | G06F 40/51 |
| 2019/0087417 A1 * | 3/2019 | Wang | ....................... | G06F 40/44 |
| 2019/0129947 A1 * | 5/2019 | Shin | ......................... | G06F 40/58 |

(Continued)

FOREIGN PATENT DOCUMENTS

| | | |
|---|---|---|
| CN | 108563640 A | 9/2018 |
| CN | 110298046 A | 10/2019 |

(Continued)

OTHER PUBLICATIONS

Translated Chinese Patent CN109117483A (Year: 2019).*

(Continued)

*Primary Examiner* — Paras D Shah
(74) *Attorney, Agent, or Firm* — BCF LLP

(57) ABSTRACT

Methods and servers for training a translation model for translation between a rare language from a group and a target language. The method includes acquiring an actual example of translation and using a transliteration function for generating a synthetic actual example of translation. The method includes acquiring a sentence in the target language, generating an artificial translation of that sentence using back-translation, and thereby generating a given artificial example of translation. The method includes generating a synthetic artificial example based on the given artificial example. The method includes training the translation model based on the synthetic actual example of translation and the synthetic artificial example of translation.

18 Claims, 8 Drawing Sheets

(56) References Cited

U.S. PATENT DOCUMENTS

2019/0251174 A1* 8/2019 Lee .................. G06F 40/51
2020/0210772 A1* 7/2020 Bojar ................ G06F 18/2148

FOREIGN PATENT DOCUMENTS

| CN | 110717341 A | 1/2020 |
| CN | 111046677 A | 4/2020 |
| RU | 2607989 C1 | 1/2017 |
| RU | 2644071 C2 | 2/2018 |

OTHER PUBLICATIONS

Di Gangi, Mattia A., et al. "Data augmentation for end-to-end speech translation: FBK@ IWSLT '19." Proceedings of the 16th International Conference on Spoken Language Translation. 2019.*

Li, Yu, et al. "A diverse data augmentation strategy for low-resource neural machine translation." Information 11.5 (2020): 255.*

Libovický, Jindich, et al. "The LMU Munich system for the WMT20 very low resource supervised MT task." Proceedings of the Fifth Conference on Machine Translation. 2020.*

Rubino, Raphael, et al. "Extremely low-resource neural machine translation for Asian languages." Machine Translation 34.4 (2020): 347-382.*

Haque, Rejwanul, Chao-Hong Liu, and Andy Way. "Recent advances of low-resource neural machine translation." Machine Translation 35.4 (2021): 451-474.*

Russian Search Report dated May 30, 2022 issued in respect of the counterpart Russian Patent Application No. RU 2020142417.

* cited by examiner

METHODS AND SYSTEMS FOR CREATING A TRAINING DATASET FOR TRAINING A MACHINE LEARNING ALGORITHM (MLA) FOR A MACHINE-TRANSLATION TASK

CROSS-REFERENCE

The present application claims priority to Russian Patent Application No. 2020142417, entitled "Method and Server for Training a Machine Learning Algorithm for Translation", filed Dec. 22, 2020, the entirety of which is incorporated herein by reference.

FIELD

The present technology relates to machine learning in general and, specifically, to a method and server for training a machine learning algorithm for translation.

BACKGROUND

With the growth of users accessing the Internet, a vast number of Internet based services have surfaced. Such services include, for example, search engine services (such as Yandex™ and Google™ search engines, for example) that allow users to retrieve information by submitting queries to a search engine. Also, social network services, as well as multimedia services, enable a large variety of users with different social and cultural backgrounds to engage on unified platforms for exchanging content and information. Digital content and other information being exchanged amongst users may be in a variety of languages. For that reason, due to the ever-increasing amount of information being exchanged on the Internet, translation services such as Yandex.Translate™, for example, are often used.

The latter service has been particularly useful in allowing users to easily translate a text (or even a speech) from one language, which the user does not understand, into another one, which she does. This means that translation services are generally designed to provide a translated version of content in a language that the user understands to make that content intelligible for the user.

Translation engines are typically trained based on a large number of examples of parallel sentences between a source language and a target language. For that reason, translation engines are well suited for translating sentences between "popular languages" since a very large corpus of parallel sentences is available for training.

However, conventional computer systems providing translation services still have many drawbacks, such as when dealing with translation from a language for which a limited corpus of parallel sentences is available, which language can be considered a "rare" language from the perspective of availability of parallel sentences that can be used for training the translation algorithm.

Chinese patent application no. 110717341 entitled "Method and device for constructing old-Chinese bilingual corpus with Thai as pivot", published on Jan. 21, 2020, and according to a machine translation thereof into English, relates to a method and a device for constructing an old-Chinese bilingual corpus with Thai as a pivot, belonging to the field of natural language processing. Firstly, carrying out Thai word segmentation processing on Chinese-Thai parallel corpus data; constructing a Laos-Thai bilingual dictionary, and translating Thai sentences into Laos sentence subsequences word by using the Laos-Thai bilingual dictionary to obtain candidate Laos-Thai parallel sentence pairs; constructing a two-way LSTM-based Laos-Thai parallel sentence pair classification model, classifying candidate Laos-Thai parallel sentence pairs, and acquiring Laos-Thai bilingual parallel sentence pairs; and matching Laos with Chinese by taking the Thai as a pivot language to construct a Laos-Chinese bilingual parallel corpus.

SUMMARY

Developers of the present technology have appreciated certain technical drawbacks associated with the existing translation services. It is an object of the present technology to ameliorate at least some of the inconveniences present in the prior art.

Conventional systems are well suited for translation services between "popular" languages. Some examples of popular languages include English, French, Russian, German, Turkish, and the like. This is due to the fact that conventional systems have access to large corpuses of parallel sentences between such languages and which allows for better training of Machine Learning Algorithms (MLAs) for translation purposes.

However, conventional systems are ill suited for translating sentences from "rare" languages. Some examples of rare languages include Chuvash, Faroese, and Galician, and the like. This is due to a limited number of parallel sentences that are available between a given rare language and a target language.

In at least some embodiments of the present technology, methods and systems have been devised for generating "artificial" examples, as opposed to "actual" examples, of parallel sentences between a given rare language and a target language. Developers of the present technology have realized that generating artificial examples may allow increasing the quality of translation services that conventional systems may achieve when translating a sentence from a rare language. In some embodiments of the present technology, training datasets generated based on artificial examples of translation may be labelled as such with the purpose of allowing the translation model to discriminate during the training phase between actual examples of translation and artificial examples of translation.

As it will become apparent from the description herein further below, developers of the present technology have also devised methods and systems that allow leveraging knowledge about popular languages that are part of a same group or family of languages as the rare language for increasing the quality of translation from the rare language to a target language.

In at least some embodiments of the present technology, there is provided a translation model that is configured to acquire an input sentence that has been transliterated from one of a given group of languages into a "synthetic writing system", and provide a translated output sentence in a target language. The input sentence may be generated by a transliteration model based on a source sentence in one of the given group of languages.

How the transliteration model is implemented is not particularly limiting. In one embodiment, the transliteration model may be implemented as a Statistical Machine Translation (SMT) model trained to transliterate sentences from any one of a given group of languages into a synthetic writing system. For example, a Turkic group or family of languages comprises inter alia Turkish, Kyrgyz, Uzbek, and Chuvash languages. In this example, depending on a specific Turkic source language, the word "silver" may be written as, "*gümüş*", "*көмөш*", "*көмеш*", "*күміс*", "*күмүш*,"

*gümüş*"," *kumush*", and " *кӗмӗл* ". As such, the transliteration model is trained such that a given word is written the same way in the synthetic writing system, irrespective of which of the Turkic languages is the source language of that given word. It is noted that in some embodiments of the present technology, the synthetic writing system can be the writing system of one of the languages of the group of languages. In some embodiments of the present technology, the use of the synthetic writing system allows help to make the training process of the Machine Learning Algorithm (MLA) more efficient by removing phonetical or orthographical differences between the languages of the group of languages.

As such, in some embodiments of the present technology, it can be said that the translation model may be a given model that is able to translate sentences from any one of a given group of languages into a target language. More particularly, a source sentence in any one of a group of languages may be received by a computer system, transliterated into the synthetic writing system via the transliteration model, inputted into the translation model, and used thereby for generating an output sentence in a target language.

In a first broad aspect of the present technology, there is provided a method of training a translation model for performing translation between a rare language from a group of languages and a target language. The method is executable by a server. The server has access to a plurality of actual examples of parallel sentences between the group of languages and the target language. A number of actual examples between the rare language and the target language is comparatively low to a number of actual examples between other languages from the group of languages and the target language. The method comprises acquiring, by the server, a given actual example having a first sentence in one of the group of languages and a respective second sentence in the target language being an actual translation of the first sentence. The method comprises generating, by the server employing a transliteration function, a first synthetic sentence based on the first sentence for the given actual example, thereby generating a synthetic actual example having the first synthetic sentence and the respective second sentence. The first synthetic sentence is a transliteration of the first sentence into a synthetic writing system. The method comprises acquiring, by the server, a third sentence in the target language. The method comprises generating, by the server employing an other translation model, a fourth sentence in the rare language for the third sentence using back-translation. The fourth sentence is an artificial translation of the third sentence. The fourth sentence and the third sentence form a given artificial example. The method comprises generating, by the server employing the transliteration function, a fourth synthetic sentence based the fourth sentence for the given artificial example, thereby generating a synthetic artificial example having the fourth synthetic sentence and the third sentence. The fourth synthetic sentence is a transliteration of the fourth sentence into the synthetic writing system. The method comprises training, by the server, the translation model based on the synthetic actual example and the synthetic artificial example. The training is for receiving a given in-use sentence in the rare language, generating a synthetic in-use sentence based on the given in-use sentence by employing the transliteration function, and translating using the translation model the in-use synthetic sentence into a respective in-use sentence in the target language.

In some embodiments of the method, the method further comprises generating, by the server, a training dataset based on the synthetic artificial example. The training dataset comprises a label indicative of that the fourth synthetic sentence is generated based on the artificial translation of the third sentence. The training the translation model comprises inputting, by the server, the training dataset into the translation model. The translation model uses the label for discriminating between (i) training datasets generated based on actual translations and (ii) training datasets generated based on artificial translations.

In some embodiments of the method, the generating the synthetic actual example comprises generating, by the server, a plurality of synthetic actual examples for respective ones from the plurality of actual examples. The third sentence is one of a plurality of third sentences. The generating the synthetic artificial example comprises generating, by the server, a plurality of synthetic artificial examples for respective ones from a plurality of artificial examples. The training the translation model comprises training, by the server, the translation model based on the plurality of synthetic actual examples and the plurality of synthetic artificial examples.

In some embodiments of the method, the method further comprises generating, by the server, the transliteration function by training a Statistical Machine Translation (SMT) model based on aligned corpuses of text between languages in the group of languages. The SMT model is trained for determining transliteration rules between sentences in each one of the group of languages and synthetic sentences in the synthetic writing system.

In some embodiments of the method, the group of languages is a Turkic group of languages, the Turkic group of languages comprising Turkish language, Uzbek language, Chuvash language, and Kyrgyz language. The rare language is the Chuvash language.

In some embodiments of the method, the group of languages is a Germanic group of languages, the Germanic group of languages comprising English language, German language, Dutch language, and Faroese language. The rare language is the Faroese language.

In some embodiments of the method, the group of languages is a Romance group of languages, the Romance group of languages comprising French language, Italian language, Spanish language, and Galician language. The rare language is the Galician language.

In some embodiments of the method, the other translation model is trained based on the actual examples between the rare language and the target language.

In some embodiments of the method, the method further comprises receiving, by the server, the given in-use sentence in the rare language, generating, by the server employing the transliteration model, the synthetic in-use sentence based on the given in-use sentence, and generating, by the server employing the translation model, the respective in-use sentence in the target language based on the in-use synthetic sentence.

In some embodiments of the method, the other translation model is the translation model, and the training comprises training, by the server, the translation model based on the synthetic actual examples, generating, by the server employing the translation model, the fourth sentence in the rare language for the third sentence using back-translation, and further training, by the server, the translation model based on the synthetic artificial example.

In some embodiments of the method, the third sentence is a clean sentence in the target language, the clean sentence being pre-selected by a human operator.

In a second broad aspect of the present technology, there is provided a server for training a translation model for performing translation between a rare language from a group of languages and a target language. The server has access to a plurality of actual examples of parallel sentences between the group of languages and the target language. A number of actual examples between the rare language and the target language is comparatively low to a number of actual examples between other languages from the group of languages and the target language. The server is configured to acquire a given actual example having a first sentence in one of the group of languages and a respective second sentence in the target language being an actual translation of the first sentence. The server is configured to generate, by employing a transliteration function, a first synthetic sentence based on the first sentence for the given actual example, thereby generating a synthetic actual example having the first synthetic sentence and the respective second sentence. The first synthetic sentence is a transliteration of the first sentence into a synthetic writing system. The server is configured to acquire a third sentence in the target language. The server is configured to generate, by employing an other translation model, a fourth sentence in the rare language for the third sentence using back-translation. The fourth sentence is an artificial translation of the third sentence. The fourth sentence and the third sentence form a given artificial example. The server is configured to generate, by employing the transliteration function, a fourth synthetic sentence based the fourth sentence for the given artificial example, thereby generating a synthetic artificial example having the fourth synthetic sentence and the third sentence. The fourth synthetic sentence is a transliteration of the fourth sentence into the synthetic writing system. The server is configured to train the translation model based on the synthetic actual example and the synthetic artificial example. The server is configured to train for receiving a given in-use sentence in the rare language, generating a synthetic in-use sentence based on the given in-use sentence by employing the transliteration function, and translating using the translation model the in-use synthetic sentence into a respective in-use sentence in the target language.

In some embodiments of the server, the server is further configured to generate a training dataset based on the synthetic artificial example. The training dataset comprises a label indicative of that the fourth synthetic sentence is generated based on the artificial translation of the third sentence. The server configured to train the translation model comprises the server configured to input the training dataset into the translation model. The translation model uses the label for discriminating between (i) training datasets generated based on actual translations and (ii) training datasets generated based on artificial translations.

In some embodiments of the server, to generate the synthetic actual example comprises the server configured to generate a plurality of synthetic actual examples for respective ones from the plurality of actual examples. The third sentence is one of a plurality of third sentences and to generate the synthetic artificial example comprises the server configured to generate a plurality of synthetic artificial examples for respective ones from a plurality of artificial examples. The server configured to train the translation model comprises the server configured to train the translation model based on the plurality of synthetic actual examples and the plurality of synthetic artificial examples.

In some embodiments of the server, the server is further configured to generate the transliteration function by training a Statistical Machine Translation (SMT) model based on aligned corpuses of text between languages in the group of languages. The SMT model is trained for determining transliteration rules between sentences in each one of the group of languages and synthetic sentences in the synthetic writing system.

In some embodiments of the server, the group of languages is a Turkic group of languages, the Turkic group of languages comprising Turkish language, Uzbek language, Chuvash language, and Kyrgyz language. The rare language is the Chuvash language.

In some embodiments of the server, the group of languages is a Germanic group of languages, the Germanic group of languages comprising English language, German language, Dutch language, and Faroese language. The rare language is the Faroese language.

In some embodiments of the server, the group of languages is a Romance group of languages, the Romance group of languages comprising French language, Italian language, Spanish language, and Galician language. The rare language is the Galician language.

In some embodiments of the server, the other translation model is trained based on the actual examples between the rare language and the target language.

In some embodiments of the server, the server is further configured to receive the given in-use sentence in the rare language, generate, by employing the transliteration model, the synthetic in-use sentence based on the given in-use sentence, and generate, by employing the translation model, the respective in-use sentence in the target language based on the in-use synthetic sentence.

In some embodiments of the server, the other translation model is the translation model. The server configured to train comprises the server configured to train the translation model based on the synthetic actual examples, generate, by employing the translation model, the fourth sentence in the rare language for the third sentence using back-translation, and further train the translation model based on the synthetic artificial example.

In some embodiments of the server, the third sentence is a clean sentence in the target language. The clean sentence is pre-selected by a human operator.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
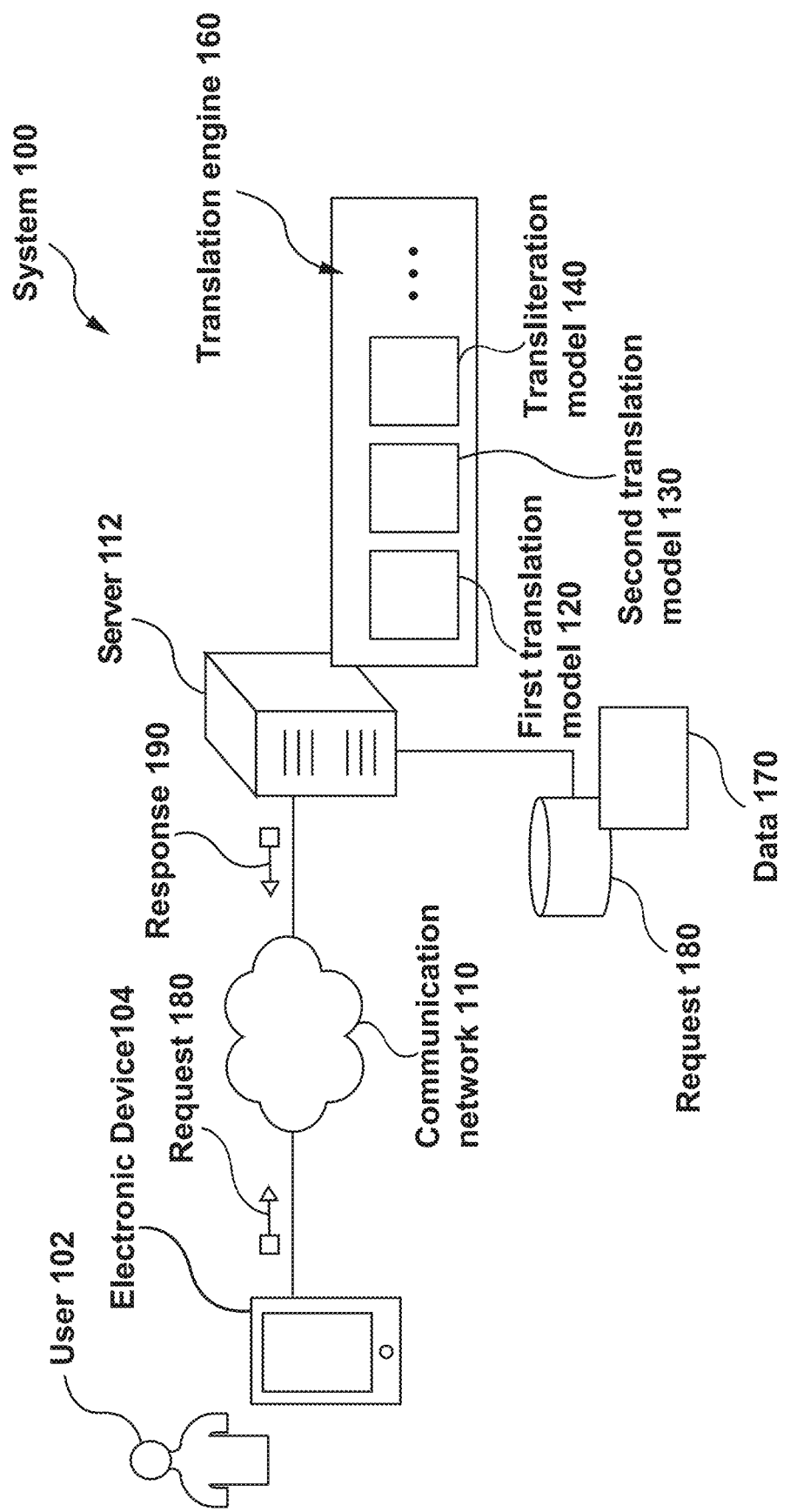
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide electronic translation services for a user 102 of an electronic device 104. For example, the system 100 may be configured to acquire a sentence in a source language and provide a translated version of that sentence in a target language. At least some components of the system 100 will now be described, however, it should be understood that other components to those depicted in FIG. 1 may be part of the system 100 without departing from the scope of the present technology.

Electronic Device

The system 100 comprises the electronic device 104, the electronic device 104 being associated with the user 102. As such, the electronic device 104 can sometimes be referred to as a "client device", "end user device", "client electronic device" or simply "device". It should be noted that the fact that the device 104 is associated with the user 102 does not need to suggest or imply any mode of operation—such as a need to log in, a need to be registered, or the like.

The implementation of the device 104 is not particularly limited, but as an example, the device 104 may be implemented as a personal computer (desktops, laptops, netbooks, etc.), a wireless communication device (such as a smartphone, a cell phone, a tablet and the like), as well as network equipment (such as routers, switches, and gateways). The device 104 comprises hardware and/or software and/or firmware (or a combination thereof), as is known in the art, to execute a browser application.

Generally speaking, the purpose of the browser application is to enable the user 102 to access one or more network resources, such as web pages, for example. How the browser application is implemented is not particularly limited. One example of the browser application may be embodied as a Yandex™ browser.

The user 102 may use the browser application for accessing a translation engine 160 for translating one or more sentences from a source language to a target language. For example, the electronic device 104 may be configured to generate a request 180 indicative of one or more sentences that the user 102 desires to be translated. Also, the electronic device 104 may be configured to receive a response 190 for displaying a translated version of one or more sentences in the target language to the user 102.

Communication Network

The device 104 is communicatively coupled to a communication network 110 for accessing the translation engine 160 of the server 112. For example, the device 104 may be communicatively coupled with the server 112 via the communication network 110 for providing the user 102 with the translation services mentioned above. The communication network 110 is configured to transmit inter alia the request 180 and the response 190.

In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

Server and Database

Returning to the description of FIG. 1, the system 100 also comprises the server 112 that can be implemented as a conventional computer server. In the depicted non-limiting embodiments of the present technology, the server 112 is a single server. In alternative non-limiting embodiments of the present technology, functionalities of the server 112 may be distributed and may be implemented via multiple servers. The server 112 may include one or more processors, one or more non-transitory memory devices, computer-readable instructions, and/or additional hardware components, additional software components, and/or combination thereof, for implementing various functionalities of the server 112, without departing from the scope of the present technology.

The system 100 also comprises a database 150 which is communicatively coupled to the server 112 and is configured to store information extracted or otherwise determined or generated by the server 112. Generally speaking, the database 150 may receive data from the server 112 which was extracted or otherwise determined or generated by the server 112 during processing for temporary and/or permanent storage thereof and may provide stored data to the server 112 for use thereof. It is contemplated that the database 150 may be split into several distributed databases without departing from the scope of the present technology.

The database 150 may be configured to store data 170 for supporting translation services providable by the translation engine 160 of the server 112. What data can be part of the data 170 will be described in greater details herein further below with reference to FIG. 3.

Generally speaking, the server 112 can be under control and/or management of a translation service provider (not depicted), such as, for example, an operator of Yandex™ translation services. It is contemplated that the provider of the translation services and the provider of the browser application may be the same provider. For example, the browser application (e.g., Yandex™ browser) and the translation services (e.g., Yandex™ translation services) may be provided, controlled and/or managed by the same operator or entity.

As mentioned above, the server 112 hosts the translation engine 160. Broadly speaking, the translation engine 160 is embodied as a plurality of computer-implemented procedures that are configured for translating one or more sentences from a source language into a target language.

It should be noted that the translation engine 160 may be configured to execute one or more Machine Learning Algorithms (MLAs). Generally speaking, MLAs can learn from training samples and make predictions on new (unseen) data. The MLAs are usually used to first build a model based on training inputs of data in order to then make data-driven predictions or decisions expressed as outputs, rather than following static computer-readable instructions.

The MLAs are commonly used as estimation models, translation models, classification models and the like. It should be understood that different types of the MLAs having different structures or topologies may be used for various tasks.

One particular type of MLAs includes Neural Networks (NNs). Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus rather than trying to determine complex statistical arrangements or mathematical algorithms for a given situation; the given NN tries to provide an "intuitive" answer based on a "feeling" for a situation.

NNs are commonly used in many such situations where it is only important to know an output based on a given input, but exactly how that output is derived is of lesser importance or is unimportant. For example, NNs are commonly used to optimize the distribution of web-traffic between servers, automatic text translation into different languages, data processing, including filtering, clustering, vector embedding, and the like.

In some embodiments of the present technology, the server 112 may be configured to execute an encoder-decoder type model. For example, an encoder portion of such models may be dedicated to source languages while a decoder portion of such models may be dedicated to target languages. In other embodiments, the server 112 may be configured to execute a transformer type model.

Furthermore, the implementation of a given MLA by the server 112 can be broadly categorized into two phases—a training phase and an in-use phase. First, the given MLA is trained in the training phase. Then, once the given MLA knows what data to expect as inputs and what data to provide as outputs, the given MLA is actually run using in-use data in the in-use phase.

As illustrated in FIG. 1, the server 112 is configured to execute a first translation model 120, a second translation model 130, and a transliteration model 140. In some embodiments of the present technology, the first translation model 120, the second translation model 130, and the transliteration model 140 may be implemented by the server 112 as respective MLAs having been trained for execution of respective computer tasks. How the first translation model 120, the second translation model 130, and the transliteration model 140 can be implemented by the server 112 will be described in greater details herein further below.

Figure 2:
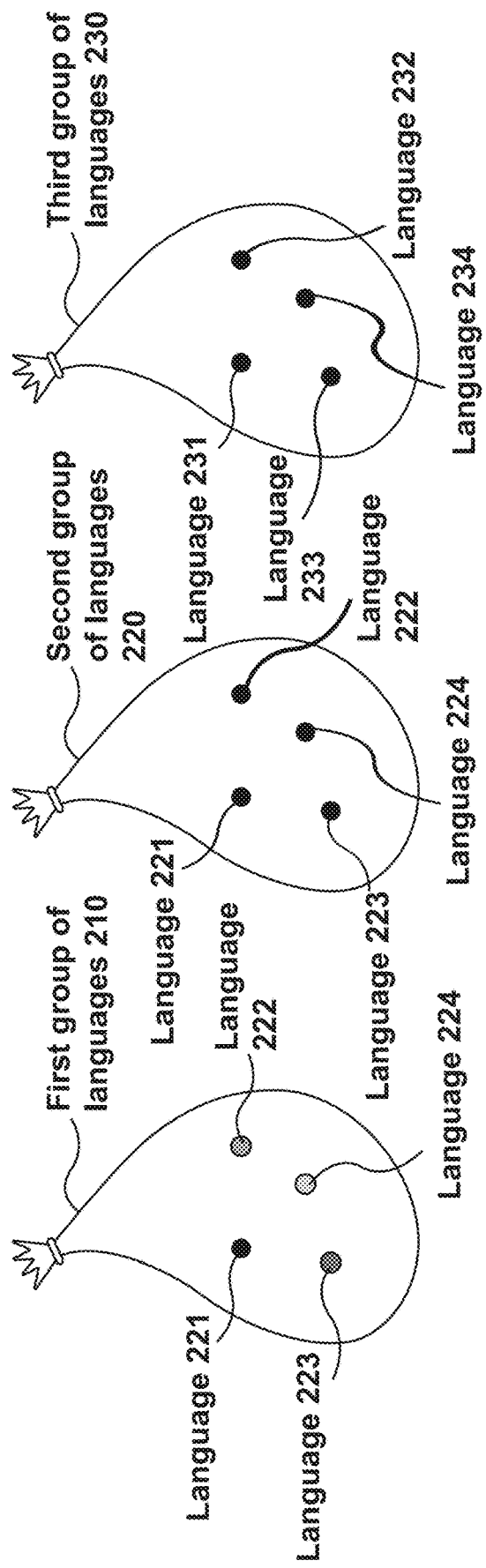
FIG. 2 depicts a representation of three groups of languages, in accordance with some non-limiting embodiments of the present technology.

With reference to FIG. 2, there is depicted a representation 200 of three groups of languages, namely a first group of languages 210, a second group of languages 220, and a third group of languages 230. Broadly speaking, a given group of languages comprises one or more languages from a language family and are related through descent from a common ancestral language, or parental language, typically called the proto-language of that family.

As illustrated, (i) the first group of languages 210 comprises languages 211, 212, 213, and 214, (ii) the second group of languages 220 comprises languages 221, 222, 223, and 224, and (iii) the third group of languages 230 comprises languages 231, 232, 233, and 234. For sake of illustration, let it be assumed that the first group of languages 210 is the Turkic group of languages, the second group of languages 220 is the Germanic group of languages, and the third group of languages 230 is the Romance group of languages. In such an example:

the languages 211, 212, 213, and 214 in the Turkic group of languages may be Chuvash language, Uzbek language, Kyrgyz language, and Turkish language, respectively;

the languages 221, 222, 223, and 224 in the Germanic group of languages may be English language, German language, Dutch language, and Faroese language, respectively; and the languages 231, 232, 233, and 234 in the Romance group of languages may be French language, Italian language, Spanish language, and Galician language.

The server 112 may be configured to execute the first translation model 120 configured to translate sentences from any one from a given group of languages to a given target language. Let it be assumed that the translation model 120 is configured to translate between the first group of languages 210 (Turkic group of languages) and the Russian language (the target language). In such a case, the server 112 may be configured to use the translation model 120 for translation sentences in any one of Chuvash language, Uzbek language, Kyrgyz language, and Turkish language into the Russian language. In this example, the translation model 120 can be referred to as a "pan-Turkic to Russian" translation model.

It should be noted that a given group of languages may comprise a given language that has a limited number of actual examples of translation between that language and the target language. In the context of the present technology, a given language having a limited number of actual examples of translation between that language and the target language is referred to as a "rare" language.

For example, in the Turkic group of languages, the rare language may be the Chuvash language because there is a limited number of actual examples of translation from the Chuvash language to the Russian language (or vice versa). In the Germanic group of languages, the rare language may be the Faroese language because there is a limited number of actual examples of translation from the Faroese language to the Russian language (or vice versa). In the Romance group of languages, the rare language may be the Galician language because there is a limited number of actual examples of translation from the Galician language to the Russian language (or vice versa).

As it will be discussed in greater details herein below, it can be said that a number of actual examples available between the rare language and the target language is comparatively low to a number of actual examples between other languages from a given group of languages and the target language.

As mentioned above, the server 112 is configured to execute the transliteration model 140. Broadly speaking, the transliteration model 140 is configured to transliterate sentences from any one of a given group of languages into a "synthetic writing system". For example, a Turkic group or family of languages comprises inter alia Turkish, Kyrgyz, Uzbek, and Chuvash languages. In this example, depending on a specific Turkic source language, the word "silver" may be written as, " gümüş ", " кӗмӗш ", " көмеш ", " күміс ", " күмүш ", " gümüş ", " kumush ", and " кӗмӗл ". As such, the transliteration model 140 is configured to output a same transliteration of a given word in the synthetic writing system, irrespective of which of the Turkic languages is the source language of that given word.

How the transliteration model 140 is implemented is not particularly limiting. In one embodiment, the transliteration model 140 may be implemented as a Statistical Machine Translation (SMT) model trained to transliterate sentences from any one of a given group of languages into a synthetic writing system.

In some embodiments of the present technology, it is contemplated that the server 112 may be configured to generate a given transliteration function by training an SMT model based on aligned corpuses of text between languages in a given group of languages. In these embodiments, the SMT model is trained for determining transliteration rules between sentences in each one of the given group of languages and synthetic versions of those sentences in the synthetic writing system.

In at least some embodiments of the present technology, the transliteration function may be generated by the server 112 using parallel corpuses of text extracted from literary works comprising accurately aligned sentences. Such literary works may comprise the Bible, the Quran, the Torah, and so forth, where each sentence is uniquely identifiable in respective linguistic versions thereof.

Figure 3:
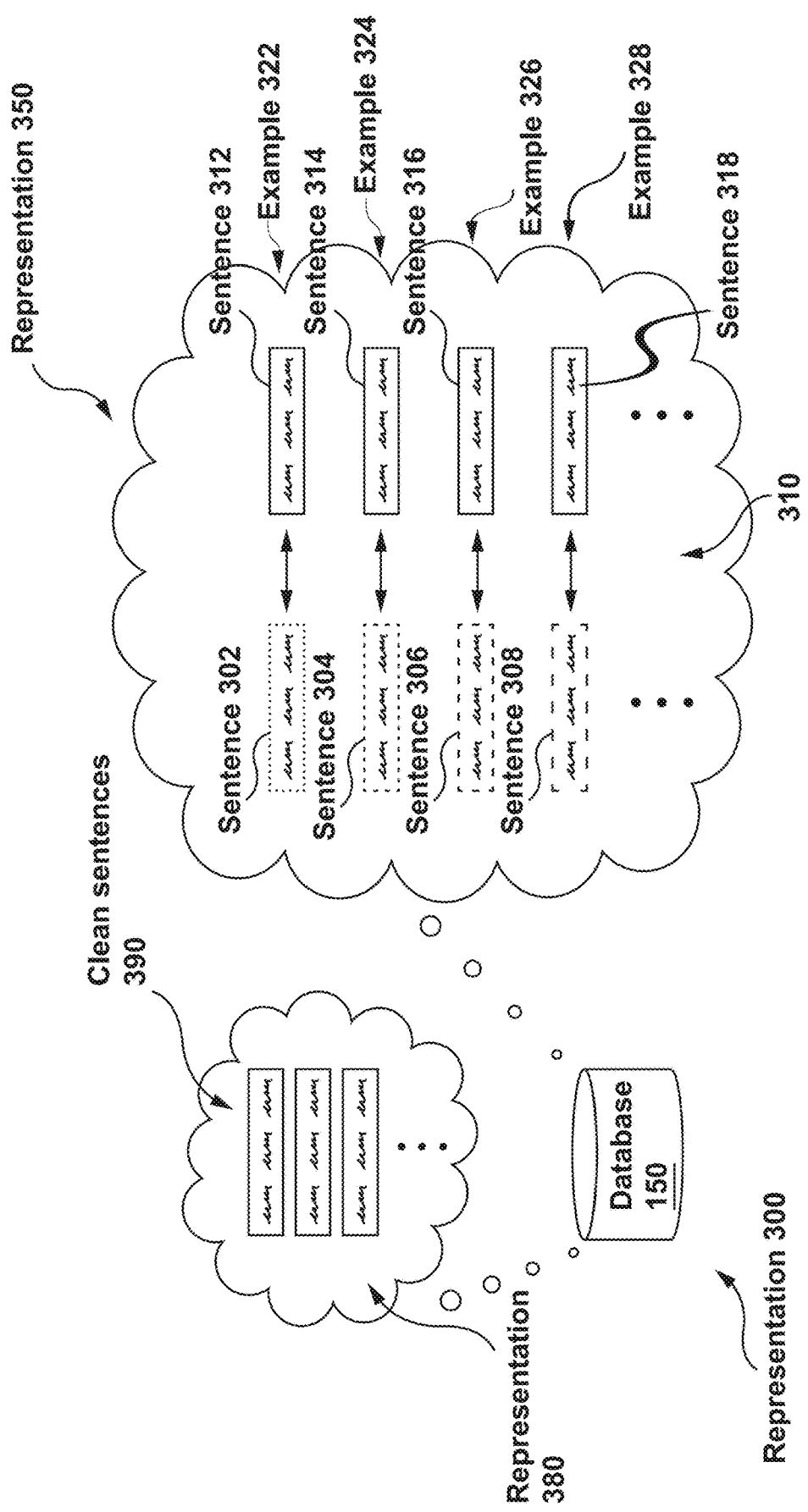
FIG. 3 depicts a representation of a plurality of actual examples of translation between a given group of languages of FIG. 2 and a given target language stored by the system of FIG. 1, and a representation of a plurality of clean sentences in the target language stored by the system of FIG. 1, in accordance with some non-limiting embodiments of the present technology.

With reference to FIG. 3, there is depicted a representation 300 of at least some data stored by the database 150. More particularly, there is depicted a representation 350 of a plurality of actual examples of parallel sentences 310. There is depicted a first actual example 322, a second actual example 324, a third actual example 326, and a fourth actual example 328. The plurality of actual examples of parallel sentence 310 is part of the data 170 stored by the database 150.

It should be noted that the database 150 stores the plurality of actual examples 310 for the group of languages 210. In other words, the plurality of actual examples 310 comprises actual examples of parallel sentences between languages in the group of languages 210 and the target language.

For instance, let it be assumed that:
the first actual example 322 a sentence 302 in Chuvash and a sentence 312 in Russian;
the second actual example 324 has a sentence 304 in Uzbek and a sentence 314 in Russian;
the third actual example 326 has a sentence 306 in Kyrgyz and a sentence 316 in Russian; and
the fourth actual example 328 has a sentence 308 in Turkish and a sentence 318 in Russian.

As mentioned above, Chuvash is a rare language in the group of languages 210 since a limited number of actual examples are available at the database 150. This means that a number of actual examples amongst the plurality of examples 310 which are between the Chuvash language and the Russian language is considerably smaller than a number of actual examples between other languages from the group of languages 210 and the Russian language. As it will become apparent from the description herein below, the plurality of actual examples 310 may be used by the server 112 for training the translation model 120.

Also depicted in FIG. 3 is a representation 380 of a plurality of "clean" sentences 390 in a target language. Sentences in the plurality of clean sentences 390 may be selected by human assessors, for example, tasked with identifying sentences in a target language that are accurately written. As it will be described herein further below, the plurality of clean sentences 390 in the target language can be used by the server 112 for generating "artificial" examples of translation between a given rare language and the target language and which can be used for further training the translation model 120.

Figure 4:
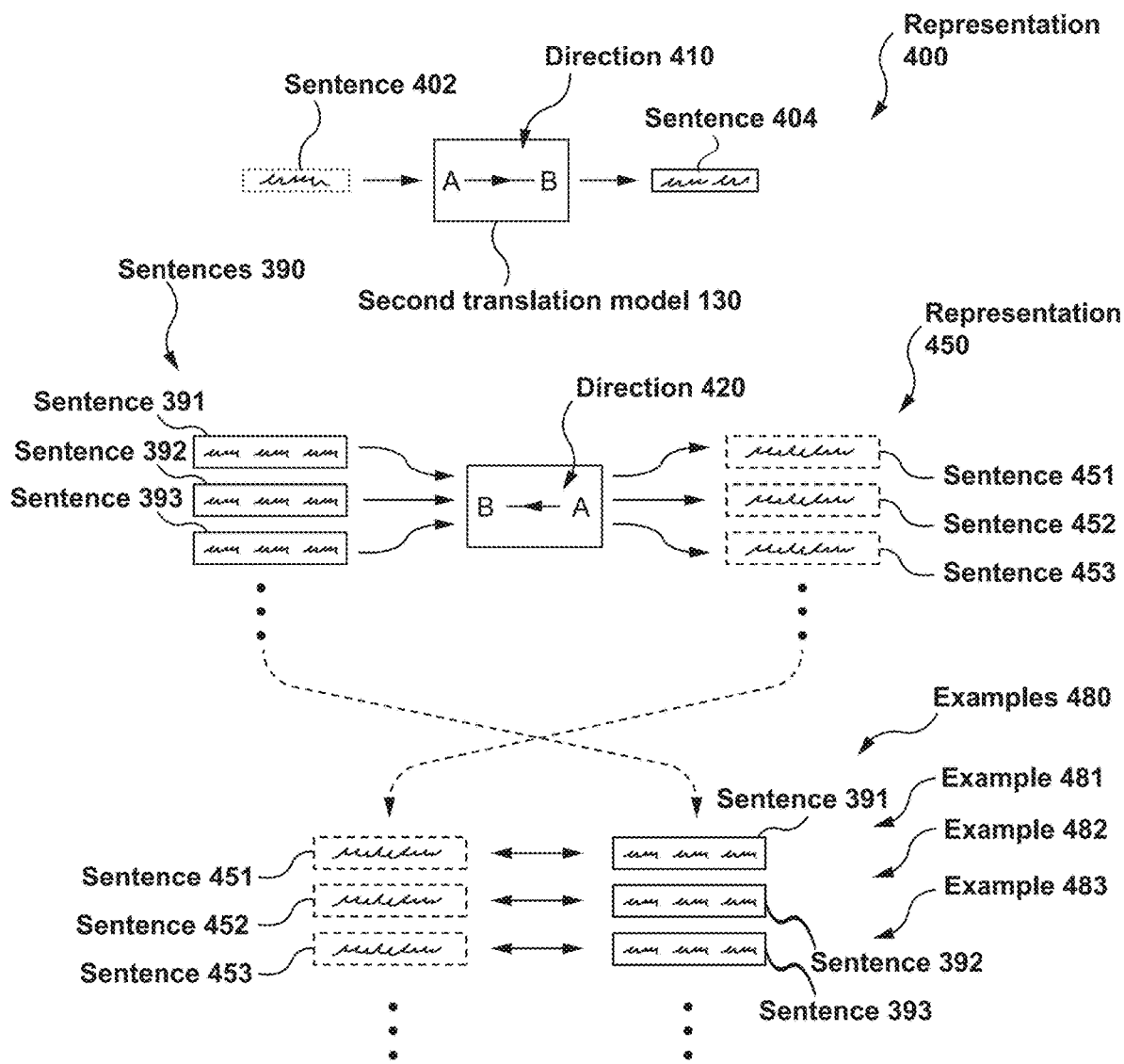
FIG. 4 depicts a representation of a given translation model of the system of FIG. 1 and how the given translation model is used for performing backtranslation of the plurality of clean sentences in the target language, in accordance with some non-limiting embodiments of the present technology.

With reference to FIG. 4, there is depicted a representation 400 of how the second translation model 130 can be used by the server 112 for performing translation from a source language to a target language, and a representation 450 of how the second translation model 130 is used by the server 112 for performing "back translation" from the target language to the source language in the context of the present technology.

The second translation model 130 may be trained by the server 112 based on the actual examples between the rare language (i.e. the source language) and the target language from the plurality of actual examples 310. During the training phase thereof, for example, the server 112 may be configured to use a given sentence in Chuvash as input into the second translation model 130 and the output of the second translation model 130 may be compared against a parallel sentence in Russian for adjusting the second translation model 130. As such, the second translation model 130 may be trained for receiving during an in-use phase thereof a given sentence 402 in Chuvash and output an in-use sentence 404 in Russian.

It should be noted that the quality of translation of the so-trained second translation model 130 may be limited due to the number of actual examples of translation between the Chuvash language and the Russian language available for training purposes since the Chuvash language is a rare language.

However, in the context of the present technology, it is contemplated that the server 112 may be configured to use the second translation model 130 for performing back translation from the target language (e.g. Russian) to the rare language (e.g., Chuvash). As seen on FIG. 4, although the server 112 may train the second translation model 130 to translate sentences in a direction 410 (rare to target), the server 112 may be configured to use the second translation model 130 to translate in a direction 420 (target to rare), opposite from the direction 420.

The server 112 may be configured to use the second translation model 130 in the direction 420 for generating artificial examples of translation between the rare language and the target language. To that end, the server 112 may be configured to retrieve the plurality of clean sentences 390 in the target language (e.g., accurately written sentences in Russian) and input them into the second translation model 130 for performing back translation into Chuvash. As such, the server 112 may be configured to generate an artificial sentence 451 for the sentence 391, an artificial sentence 452 for the sentence 392, and an artificial sentence 453 for the sentence 393.

The server 112 may be configured to generate a plurality of artificial examples 480 between the rare language and the target language. As seen of FIG. 4, the plurality of artificial examples 480 comprises:
an artificial example 481 having the artificial sentence 451 and the sentence 391;
an artificial example 482 having the artificial sentence 452 and the sentence 392; and
an artificial example 483 having the artificial sentence 453 and the sentence 393.

The server 112 may be configured to use the plurality of artificial examples 480 in addition to the plurality of actual examples 310 for training the first translation model 120. As it will now be described with reference to FIG. 5, the server 112 may be configured to use the transliteration model 140 in order to generate a plurality synthetic actual examples based on the plurality of actual examples 310 and a plurality of synthetic artificial examples based on the plurality of artificial examples 480.

Figure 5:
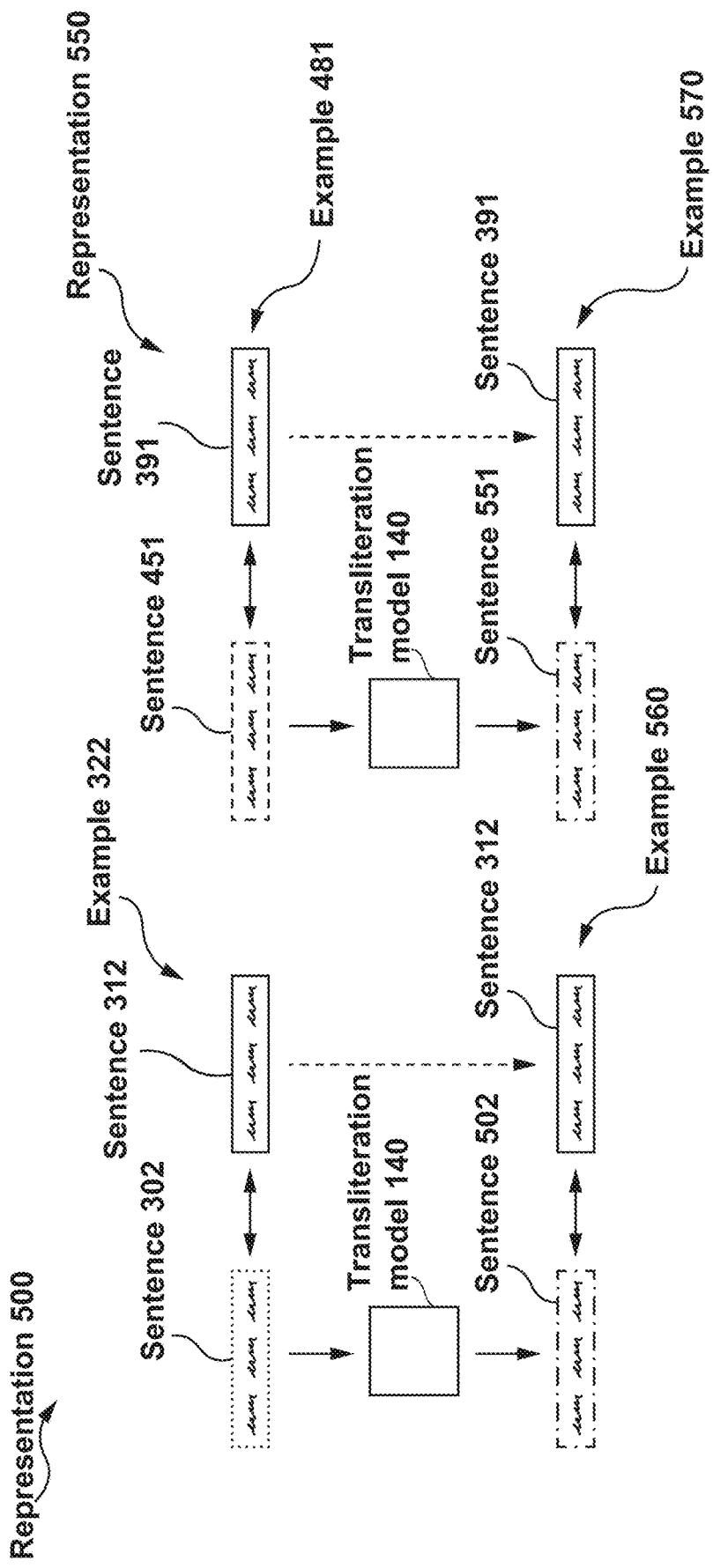
FIG. 5 depicts a representation of how a given actual example and a given artificial example are processed by system of FIG. 1 for generating training datasets for training an other translation model of the system of FIG. 1, in accordance with some non-limiting embodiments of the present technology.

In FIG. 5, there is depicted a representation 500 of how the server 112 may be configured to generate a synthetic actual example 560 based on the actual example 322 and a representation 550 of how the server 112 may be configured to generate a synthetic artificial example 570 based on the artificial example 481.

The server 112 is configured to input the sentence 302 from the actual example 322 into the transliteration model 140 that is configured to output a synthetic sentence 502 written in the synthetic writing system. The server 112 is configured to generate the synthetic actual example 560 by pairing the synthetic sentence 502 with the sentence 312 from the actual example 322. It should be noted that the server 112 may be configured to generate a plurality of synthetic actual examples based on respective ones from the plurality of actual examples 310 similarly to how the synthetic actual example 560 is generated based on the actual example 322.

The server 112 is configured to input the artificial sentence 451 from the artificial example 481 into the transliteration model 140 that is configured to output a synthetic sentence 551 written in the synthetic writing system. The server 112 is configured to generate the synthetic artificial example 570 by pairing the synthetic sentence 551 with the sentence 391 from the artificial example 481. It should be noted that the server 112 may be configured to generate a plurality of synthetic artificial examples based on respective ones from the plurality of artificial examples 480 similarly to how the synthetic artificial example 570 is generated based on the artificial example 481.

Figure 6:
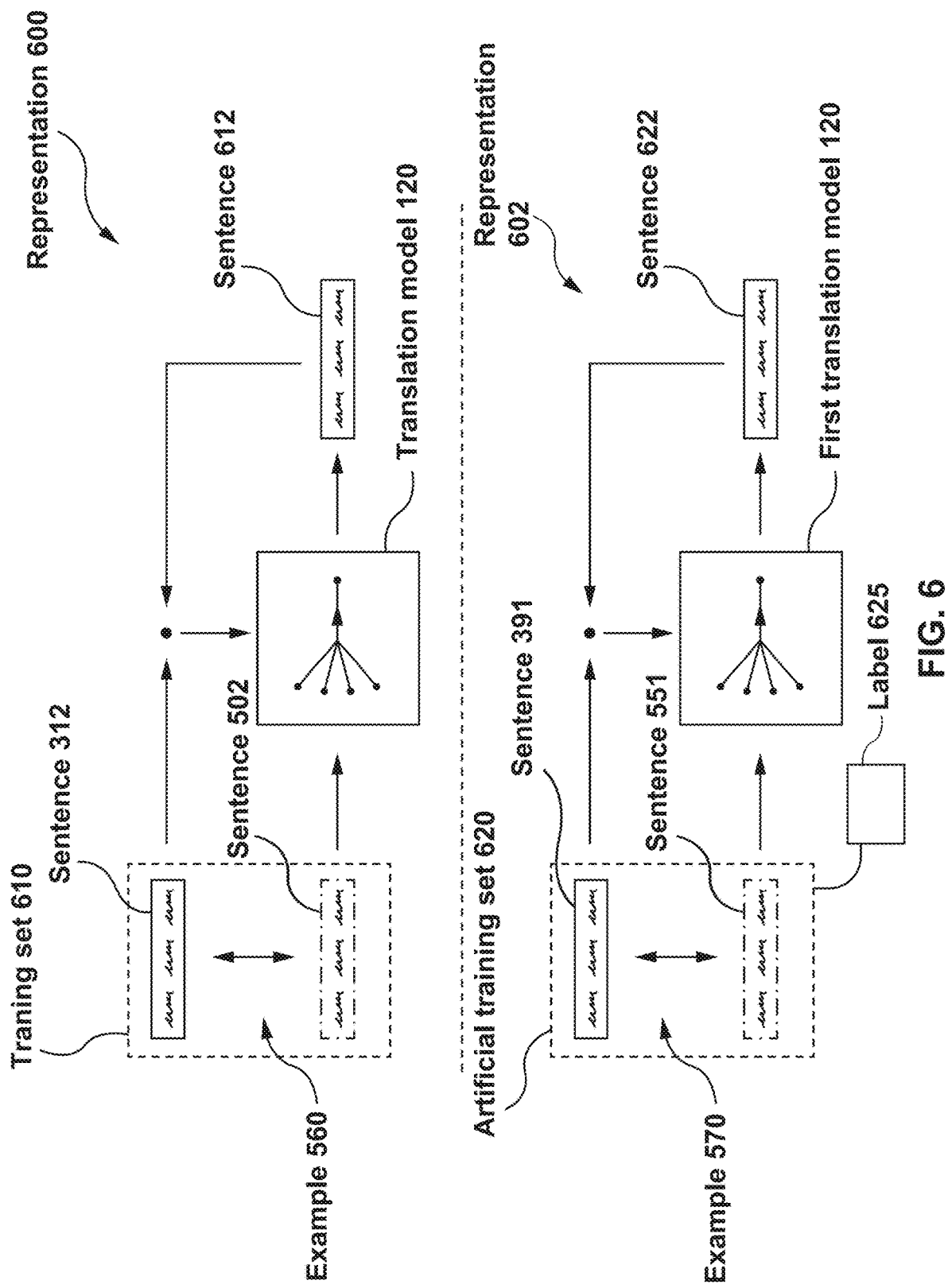
FIG. 6 depicts a representation of two single training iterations of the other translation model, in accordance with some non-limiting embodiments of the present technology.

With reference to FIG. 6, there is depicted a representation 600 of a single training iteration performed on the first translation model 120 based on the synthetic actual example 560 and a representation 602 of a single training iteration performed on the first translation model 120 based on the synthetic artificial example 570.

The server 112 may make use of the synthetic actual example 560 for generating a synthetic actual training set 610. The server 112 may be configured to input the synthetic sentence 502 into the first translation model 120 and the first translation model 120 is configured to output a sentence 612 in the target language. The server 112 is configured to compare the sentence 612 against the sentence 312 from the synthetic actual training set 610, and based on that comparison, is configured to adjust the first translation model 120. To that end, the server 112 may be configured to employ one or more adjustment techniques such as, for example, a back-propagation technique. However, other adjustment techniques may be used as is known in the art.

The server 112 may be configured to generate a plurality of synthetic actual training sets based on the plurality of synthetic actual examples, similarly to how the server 112 is configured to generate the synthetic actual training set 610. The server 112 may be configured to perform a large number of training iterations based on respective ones form the plurality of synthetic actual examples similarly to how the server 112 is configured to perform the training iteration based on the synthetic actual training set 610.

In addition to using the plurality of synthetic actual examples for training the first translation model 120, the server 112 is also configured to use the plurality of synthetic artificial examples for training the first translation model 120. This may allow to increase the translation quality of the first translation model 120 when the source sentence is written in the rare langue.

The server 112 may make use of the synthetic artificial example 570 for generating a synthetic artificial training set 620. In some embodiments, the server 112 may be configured to generate a label 625 indicative of that the synthetic artificial training set 620 is generated based on a given artificial example, as opposed to a given actual example.

The server 112 may be configured to input the synthetic sentence 551 into the first translation model 120 and the first translation model 120 is configured to output a sentence 622 in the target language. The server 112 is configured to compare the sentence 622 against the sentence 391 from the synthetic artificial training set 620, and based on that comparison, is configured to adjust the first translation model 120. To that end, the server 112 may be configured to employ one or more adjustment techniques such as, for example, a back-propagation technique. However, other adjustment techniques may be used as is known in the art.

It should be noted that in some embodiments of the present technology, the server 112 may further be configured to input the label 625 indicative of that the training set is based on an artificial example of translation, as opposed to being based on an actual example of translation. This may allow the first translation model 120 to discriminate between artificial and actual examples of translation. The first translation model 120 being able to discriminate between artificial and actual examples may allow the first translation model 120 to minimize the effect of training iterations performed based on artificial examples if compared to training iterations performed based on actual examples.

The server 112 may be configured to generate a plurality of synthetic artificial training sets based on the plurality of synthetic artificial examples, similarly to how the server 112 is configured to generate the synthetic artificial training set 620. The server 112 may be configured to perform a large number of training iterations based on respective ones form the plurality of synthetic artificial examples similarly to how the server 112 is configured to perform the training iteration based on the synthetic artificial training set 620.

Figure 7:
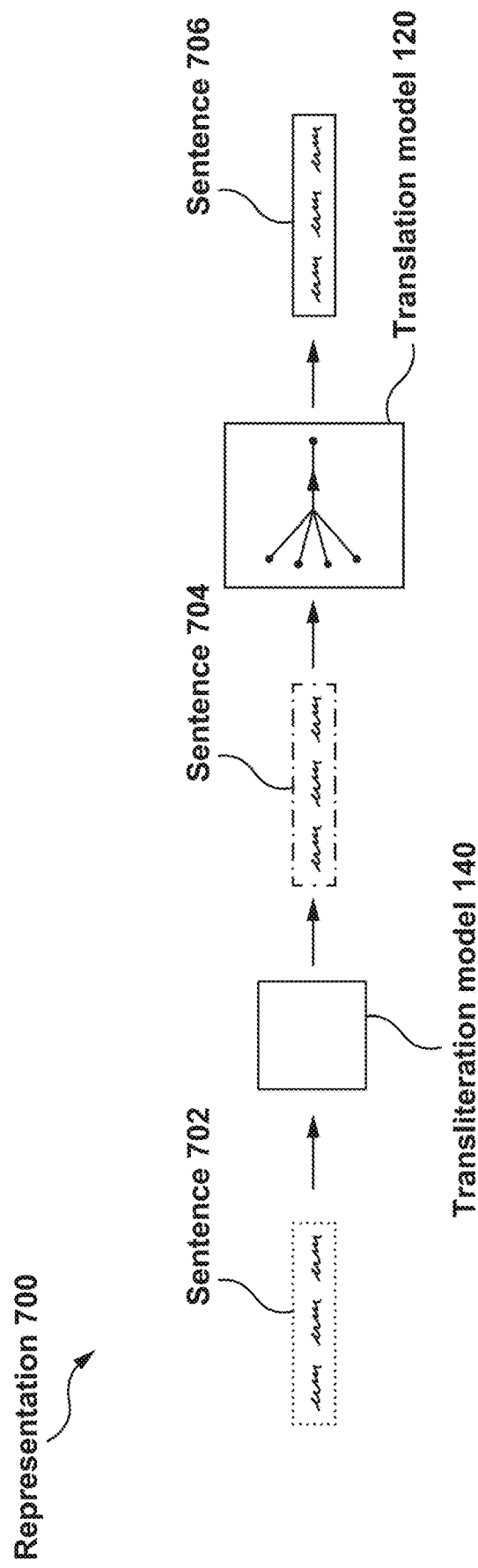
FIG. 7 depicts a representation of a single in-use iteration of the other translation model, in accordance with some non-limiting embodiments of the present technology.

In some embodiments of the present technology, the server 112 may be configured to execute an in-use phase of the translation model 120. With reference to FIG. 7, there is depicted a representation 700 of how the server 112 may be configured to generate a sentence 706 in the target language based on a given in-use sentence 702 in the rare language.

The server 112 is configured to receive the in-use sentence 702 in the rare language. For example, the server 112 may be configured to acquire an indication of the in-use sentence 702 from the electronic device 104 associated with the user 102 via the communication network 110. The server 112 is configured to employ the transliteration model 140 in order to generate a synthetic in-use sentence 704 based on the in-use sentence 702. The server 112 is configured to input the synthetic in-use sentence 704 into the translation model 120 that is configured to generate the sentence 706 which is a translation of the in-use sentence 702 from the rare language to the target language.

Figure 8:
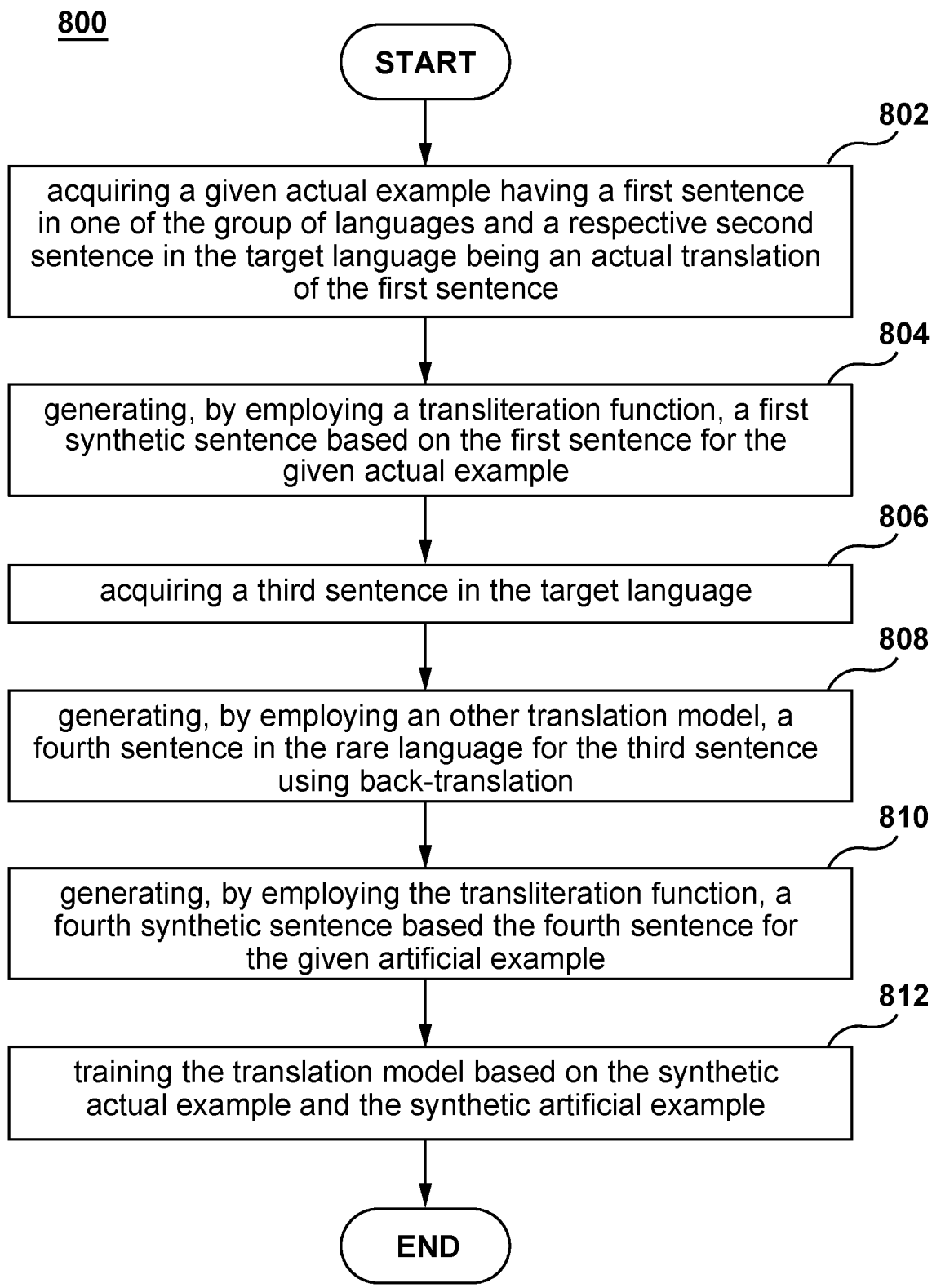
FIG. 8 depicts a schematic block diagram of a method performed by the system of FIG. 1, in accordance with some non-limiting embodiments of the present technology.

With reference to FIG. 8, there is depicted a schematic representation of a method 800 of training the translation model 120. The method 800 is performed by the server 112. Various steps of the computer-implemented method 800 will now be described in greater details.

STEP 802: Acquiring a Given Actual Example Having a First Sentence in One of the Group of Languages and a Respective Second Sentence in the Target Language Being an Actual Translation of the First Sentence The method 800 begins at step 802 with the server 112 configured to acquire a given actual example having a first sentence in one of a group of languages and a respective second sentence in a target language being an actual translation of the first sentence.

For example, the server 112 may be configured to acquire a given one amongst the plurality of actual examples 310 (see FIG. 3). Let it be assumed that the target language is Russian, and the group of languages is the Turkic group of languages. As such the server 112 may be configured to acquire a given one amongst the first actual example 322, the second actual example 324, the third actual example 326, and the fourth actual example 328.

In some embodiments, the group of languages is a Turkic group of languages. The Turkic group of languages comprises Turkish language, Uzbek language, Chuvash language, and Kyrgyz language. The Chuvash language is a rare language within the Turkic group of languages.

In other embodiments, the group of languages is a Germanic group of languages. The Germanic group of languages comprises English language, German language, Dutch language, and Faroese language. The Chuvash language is a rare language within the Germanic group of languages.

In further embodiments, the group of languages is a Romance group of languages. The Romance group of languages comprises French language, Italian language, Spanish language, and Galician language. The Galician language is a rare language within the Romance group of languages.

STEP 804: Generating, by Employing a Transliteration Function, a First Synthetic Sentence Based on the First Sentence for the Given Actual Example The method 800 continues to step 804 with the server 112 configured to generate, by employing a transliteration function, a first synthetic sentence based on the first sentence for the given actual example. The first synthetic sentence is a transliteration of the first sentence into a synthetic writing system. The server 112 thereby generates a synthetic actual example having the first synthetic sentence and the respective second sentence.

Let it be assumed that the first sentence and the second sentence of the given actual example are the sentence 302 and the sentence 312 of the first actual example 322. As such, the server 112 is configured to generate the synthetic sentence 502 based on the sentence 302. The server 112. Thereby generates the synthetic actual example 560 having the synthetic sentence 502 and the sentence 312.

In some embodiments of the present technology, the server 112 may be configured to generate the transliteration function by training a SMT model based on aligned corpuses of text between languages in the group of languages. The SMT model is trained for determining transliteration rules between sentences in each one of the group of languages and synthetic sentences in the synthetic writing system.

STEP 806: Acquiring a Third Sentence in the Target Language

The method 800 continues to step 806 with the server 112 configured to acquire a third sentence in the target language. For example, the server 112 may be configured to acquire one of the plurality of clean sentences 390 in the target language. Let it be assumed that the server 112 acquires from the database 150 the sentence 391. It can be said that the sentence 391 is a high-quality sentence in the target language. The sentence 391 may be pre-selected by a human operator and stored in the database 150.

STEP 808: Generating, by Employing an Other Translation Model, a Fourth Sentence in the Rare Language for the Third Sentence Using Back-Translation The method 800 continues to step 808 with the server 112 configured to generating, by employing an other translation model, a fourth sentence in the rare language for the third sentence using back-translation. The fourth sentence is an artificial translation of the third sentence. The fourth sentence and the third sentence form a given artificial example. For example, the server 112 may be configured to use the translation model 130 in the direction 420 (back-translation) for translating the sentence 391 and thereby generate the sentence 451.

In some embodiments, the other translation model may be trained based on the actual examples between the rare language and the target language.

In other embodiments, the other translation model may be the translation model. In other words, the server 112 may be configured to use the translation model 120 for performing back-translation of the sentence 391 for generating the sentence 451. This means that in such embodiments, the other translation model may be the translation model 120 being trained by the server 112 via the method 800. In such an embodiment, the server 112 may be configured to first train the translation model 120 based on the synthetic actual examples, then use the translation model 120 for generating synthetic artificial examples via back-translation, and then further train the translation model 120 based on the synthetic artificial examples.

STEP 810: Generating, by Employing the Transliteration Function, a Fourth Synthetic Sentence Based the Fourth Sentence for the Given Artificial Example The method 800 continues to step 810 with the server 112 configured to generate, by employing the transliteration function, a fourth synthetic sentence based the fourth sentence for the given artificial example. The fourth synthetic sentence is a transliteration of the fourth sentence into the synthetic writing system. The server 112 thereby generates a synthetic artificial example having the fourth synthetic sentence and the third sentence.

For example, the server 112 may be configured to generate the synthetic sentence 551 based on the sentence 451. As such, the server 112 may be configured to generate a synthetic artificial example 570 having the synthetic sentence 551 and the sentence 391.

STEP 812: Training the Translation Model Based on the Synthetic Actual Example and the Synthetic Artificial Example The method 800 continues to step 812 with the server 112 configured to train the translation model 120 based on the synthetic actual example and the synthetic artificial example. For example, the server 112 may be configured to use the synthetic actual example 560 and the synthetic artificial example 570 for training the translation model 120. The server 112 is configured to train the translation model 120 for receiving a given in-use sentence in the rare language, generating a synthetic in-use sentence based on the given in-use sentence by employing the transliteration function, and translating using the translation model 120 the in-use synthetic sentence into a respective in-use sentence in the target language.

In some embodiments, the server 112 may be configured to generate the training dataset 620 based on the synthetic artificial example 570. The training dataset 620 comprises a label 625 indicative of that the fourth synthetic sentence 551 is generated based on the artificial translation of the third sentence 391. The server 112 may input the training dataset 625 into the translation model 120 and the translation model 120 may use the label 625 for discriminating between (i)

training datasets generated based on actual translations and (ii) training datasets generated based on artificial translations.

For example, during the in-use phase of the translation model 120, the server 112 may be configured to receive the in-use sentence 702 in the rare language, generate the synthetic in-use sentence 704 based on the in-use sentence 702, and generate the in-use sentence 706 in the target language based on the in-use synthetic sentence 704.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of training a machine learning translation model for performing translation between a rare language from a group of languages and a target language, the method executable by at least one server, the at least one server having access to a plurality of actual examples of parallel sentences between the group of languages and the target language, the method comprising:
   acquiring, by the at least one server, a given actual example having a first sentence in one of the group of languages and a respective second sentence in the target language being an actual translation of the first sentence;
   generating, by the at least one server employing a transliteration function, a first synthetic sentence based on the first sentence for the given actual example, the first synthetic sentence being a transliteration of the first sentence into a synthetic writing system,
      thereby generating a synthetic actual example having the first synthetic sentence and the respective second sentence;
   acquiring, by the at least one server, a third sentence in the target language;
   generating, by the at least one server employing another machine learning translation model, a fourth sentence in the rare language for the third sentence using back-translation, the fourth sentence being an artificial translation of the third sentence, the fourth sentence and the third sentence forming a given artificial example;
   generating, by the at least one server employing the transliteration function, a fourth synthetic sentence based the fourth sentence for the given artificial example, the fourth synthetic sentence being a transliteration of the fourth sentence into the synthetic writing system,
      thereby generating a synthetic artificial example having the fourth synthetic sentence and the third sentence;
   generating, by the at least one server, a training dataset comprising the synthetic artificial example and the synthetic actual example, wherein the training dataset comprises a first label indicating that the synthetic actual example is based on an actual translation, and a second label indicating that the synthetic artificial example is based on an artificial translation;
   training, by the at least one server, the machine learning translation model based on the training dataset, wherein the training comprises discriminating between artificial and actual translations using the first and the second label, wherein the first label and the second label minimize an effect of training iterations performed so that the synthetic artificial example has a lower effect on the machine learning translation model than the synthetic actual example;
   receiving a given in-use sentence in the rare language;
   generating a synthetic in-use sentence based on the given in-use sentence by employing the transliteration function; and
   translating, using the trained machine learning translation model, the in-use synthetic sentence into a respective in-use sentence in the target language.

2. The method of claim 1,
   wherein the generating the synthetic actual example comprises:
      generating, by the at least one server, a plurality of synthetic actual examples for respective ones from the plurality of actual examples;
   and wherein the third sentence is one of a plurality of third sentences and wherein the generating the synthetic artificial example comprises:
      generating, by the at least one server, a plurality of synthetic artificial examples for respective ones from a plurality of artificial examples;
   and wherein the training the machine learning translation model comprises:
      training, by the at least one server, the machine learning translation model based on the plurality of synthetic actual examples and the plurality of synthetic artificial examples.

3. The method of claim 1, wherein the method further comprises:
   generating, by the at least one server, the transliteration function by training a Statistical Machine Translation (SMT) model based on aligned corpuses of text between languages in the group of languages,
      the SMT model being trained for determining transliteration rules between sentences in each one of the group of languages and synthetic sentences in the synthetic writing system.

4. The method of claim 1, wherein the group of languages is a Turkic group of languages, the Turkic group of languages comprising Turkish language, Uzbek language, Chuvash language, and Kyrgyz language, the rare language being the Chuvash language.

5. The method of claim 1, wherein the group of languages is a Germanic group of languages, the Germanic group of languages comprising English language, German language, Dutch language, and Faroese language, the rare language being the Faroese language.

6. The method of claim 1, wherein the group of languages is a Romance group of languages, the Romance group of languages comprising French language, Italian language, Spanish language, and Galician language, the rare language being the Galician language.

7. The method of claim 1,
   wherein the other machine learning translation model is trained based on the actual examples between the rare language and the target language.

8. The method of claim 1,
   wherein the method further comprises:
      receiving, by the at least one server, the given in-use sentence in the rare language;
      generating, by the at least one server employing the transliteration function, the synthetic in-use sentence based on the given in-use sentence; and generating, by the at least one server employing the machine learning translation model, the respective in-use sentence in the target language based on the in-use synthetic sentence.

9. The method of claim 1, wherein the other machine learning translation model is the machine learning translation model, and wherein the training comprises:
    training, by the at least one server, the machine learning translation model based on the synthetic actual example;
    generating, by the at least one server employing the machine learning translation model, the fourth sentence in the rare language for the third sentence using back-translation; and
    further training, by the at least one server, the machine learning translation model based on the synthetic artificial example.

10. The method of claim 1, wherein the third sentence is a clean sentence in the target language, the clean sentence being pre-selected by a human operator.

11. A system for training a machine learning translation model for performing translation between a rare language from a group of languages and a target language, the system having access to a plurality of actual examples of parallel sentences between the group of languages and the target language, the system comprising at least one processor and memory comprising executable instructions which, when executed by the at least one processor, cause the system to:
    acquire a given actual example having a first sentence in one of the group of languages and a respective second sentence in the target language being an actual translation of the first sentence;
    generate, by employing a transliteration function, a first synthetic sentence based on the first sentence for the given actual example, the first synthetic sentence being a transliteration of the first sentence into a synthetic writing system,
        thereby generating a synthetic actual example having the first synthetic sentence and the respective second sentence;
    acquire a third sentence in the target language;
    generate, by employing another machine learning translation model, a fourth sentence in the rare language for the third sentence using back-translation, the fourth sentence being an artificial translation of the third sentence, the fourth sentence and the third sentence forming a given artificial example;
    generate, by employing the transliteration function, a fourth synthetic sentence based the fourth sentence for the given artificial example, the fourth synthetic sentence being a transliteration of the fourth sentence into the synthetic writing system,
        thereby generating a synthetic artificial example having the fourth synthetic sentence and the third sentence;
    generate a training dataset comprising the synthetic artificial example and the synthetic actual example, wherein the training dataset comprises a first label indicating that the synthetic actual example is based on an actual translation, and a second label indicating that the synthetic artificial example is based on an artificial translation; and
    train the machine learning translation model based on the training dataset, wherein the training comprises discriminating between artificial and actual translations using the first and the second label, wherein the first label and the second label minimize an effect of training iterations performed so that the synthetic artificial example has a lower effect on the machine learning translation model than the synthetic actual example;
    receive a given in-use sentence in the rare language;
    generate a synthetic in-use sentence based on the given in-use sentence by employing the transliteration function; and
    translate using the machine learning translation model the in-use synthetic sentence into a respective in-use sentence in the target language.

12. The system of claim 11, wherein the instructions that cause the system to generate the synthetic actual example comprises instructions that cause the system to:
    generate a plurality of synthetic actual examples for respective ones from the plurality of actual examples;
wherein the third sentence is one of a plurality of third sentences and wherein the instructions that cause the system to generate the synthetic artificial example comprise instructions that cause the system to:
    generate a plurality of synthetic artificial examples for respective ones from a plurality of artificial examples;
and wherein the instructions that cause the system to train the machine learning translation model comprise instructions that cause the system to:
    train the machine learning translation model based on the plurality of synthetic actual examples and the plurality of synthetic artificial examples.

13. The system of claim 11, wherein the instructions further cause the system to:
    generate the transliteration function by training a Statistical Machine Translation (SMT) model based on aligned corpuses of text between languages in the group of languages,
        the SMT model being trained for determining transliteration rules between sentences in each one of the group of languages and synthetic sentences in the synthetic writing system.

14. The system of claim 11, wherein the group of languages is a Turkic group of languages, the Turkic group of languages comprising Turkish language, Uzbek language, Chuvash language, and Kyrgyz language, the rare language being the Chuvash language.

15. The system of claim 11, wherein the group of languages is one of:
    a Germanic group of languages, the Germanic group of languages comprising English language, German language, Dutch language, and Faroese language, the rare language being the Faroese language,
    a Romance group of languages, the Romance group of languages comprising French language, Italian language, Spanish language, and Galician language, the rare language being the Galician language.

16. The system of claim 11, wherein the other machine learning translation model is trained based on the actual examples between the rare language and the target language.

17. The system of claim 11, wherein the instructions further cause the system to:
    receive the given in-use sentence in the rare language;
    generate, by employing the transliteration function, the synthetic in-use sentence based on the given in-use sentence; and generate, by employing the machine learning translation model, the respective in-use sentence in the target language based on the in-use synthetic sentence.

18. The system of claim 11,
wherein the other machine learning translation model is the machine learning translation model, and wherein the instructions further cause the system to:
train the machine learning translation model based on the synthetic actual example;
generate, by employing the machine learning translation model, the fourth sentence in the rare language for the third sentence using back-translation; and
further train the machine learning translation model based on the synthetic artificial example.

* * * * *